April 14, 1970   P. EPPENBERGER   3,506,111
FEEDING MECHANISM FOR WEIGHING APPARATUS
Filed Feb. 14, 1968   3 Sheets-Sheet 1

INVENTOR
PAUL EPPENBERGER
BY
ATTORNEYS

United States Patent Office 3,506,111
Patented Apr. 14, 1970

3,506,111
FEEDING MECHANISM FOR WEIGHING APPARATUS
Paul Eppenberger, Auenhofen, Amriswil, Thurgau, Switzerland, assignor to Gebruder Buhler AG, Uzwil, Switzerland
Continuation-in-part of application Ser. No. 393,134, Aug. 31, 1964. This application Feb. 14, 1968, Ser. No. 707,918
Int. Cl. G01g *13/02*
U.S. Cl. 177—120      15 Claims

ABSTRACT OF THE DISCLOSURE

A feeding mechanism includes a feeding trough having an inlet which is oriented at the lower end of a silo and a discharge which is oriented above a container associated with a weighing apparatus. A conveyor worm rotates in the trough and is effective to move material therethrough and discharge it through the discharge end into the weighing container. The discharge opening is provided with a plurality of substantially horizontally disposed and vertically spaced wire choking members or cutting elements which are effective to cut the flow of material off at the discharge when the conveyor worm is stopped in order to insure that no after-feeding occurs. The weighing apparatus operates a control for the worm which shuts off the feed when a selected weight has been obtained.

BACKGROUND OF THE INVENTION

This is a continuation-in-part application of abandoned application Ser. No. 393,134, filed Aug. 31, 1964 by the same inventor in the present case.

SUMMARY OF THE INVENTION

This invention relates to feeding mechanisms for weighing apparatus for powdered or granular material. More particularly, the invention relates to a feeding mechanism for automatic weighing apparatus, comprising a trough having a conveyor worm disposed therein, conveyor worm driving means and control means adapted to energize the work driving means in reciprocal functional relation with the weighing apparatus.

In hitherto known equipment of this kind, the lay-out of the control means is usually arranged to stop the conveyor worm drive as soon as the receptacle of the weighing apparatus contains a definite smaller amount of material than has to be weighed out. This weight of response is adjusted in accordance with the material still dropping into the weighing receptacle during run-down to complete standstill of the conveyor worm thereby completing the charge to nominal weight. Mostly, however, the precision thereby obtained did not satisfy and filling of the weighing receptacle has therefore been divided into two filling phases. A relatively large portion of a charge has been filled rapidly in a so-called main stream or coarse stream. As soon as a certain weight is attained, the filling rate slows down to what is called a precision or fine stream. This system makes it possible to obtain a higher degree of precision, since the quantity of afterflowing material after standstill of the conveyor worm is relatively small as compared with the nominal weight. The precision stream can be obtained by reducing the rotation speed of the conveyor worm. Often, however, two conveyor worms are used, viz., a main worm operating during the main stream phase is stopped during the precision stream phase; and an auxiliary worm feeding the precision stream until the weighing receptacle is filled to a definite weight. This arrangement, however, requires a complicated control system and moreover a rather expensive structure.

A primary object of this invention is to provide a feeding mechanism for automatic weighing apparatus obviating the above-mentioned drawbacks.

According to the invention, the new feeding mechanism is characterized in that choking means facilitating initiation of a pressure formation in the material flow and forming a definite separating area, are disposed at the discharge end of said trough.

Owing to the formation of a pressure, the conveyor worm stops immediately upon response of the control system and the volume to be defined remains uniform on account of the formation of a definite separating area. If in continuation of the basic idea of this invention, the choking means are constituted by a number of substantially horizontally extending wire members, a two-phase type filling is in many cases no longer necessary. Control and structure are amazingly simple.

According to a further development of the invention, the precision of dosing can be further improved by connection of the feeding mechanism through a downpipe with a silo chamber, wherein means for selectively fluidizing stored material and retaining means disposed above the downpipe, in combination with the porous bottoms, form a pair of bottleneck passages stopping the material flow as soon as a shut-off valve controlled by a filling height detector stops the compressed air supply. This arrangement ensures a permanently uniform filling level and uniform pressure conditions at the inlet of the feeding worm unit, as well as an amazingly accurate and uniform dosing precision.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which are illustrated and described preferred embodiments of the invention.

BRIEF DESCRIPTION OF THE DRAWINGS

In the drawings:
FIG. 6 is a view similar to FIG. 3, but on a larger scale of another embodiment of the invention;
and
FIG. 7 is a partial axial sectional view taken along the line VII—VII of FIG. 6.

DESCRIPTION OF THE PREFERRED EMBODIMENTS

Figure 1:
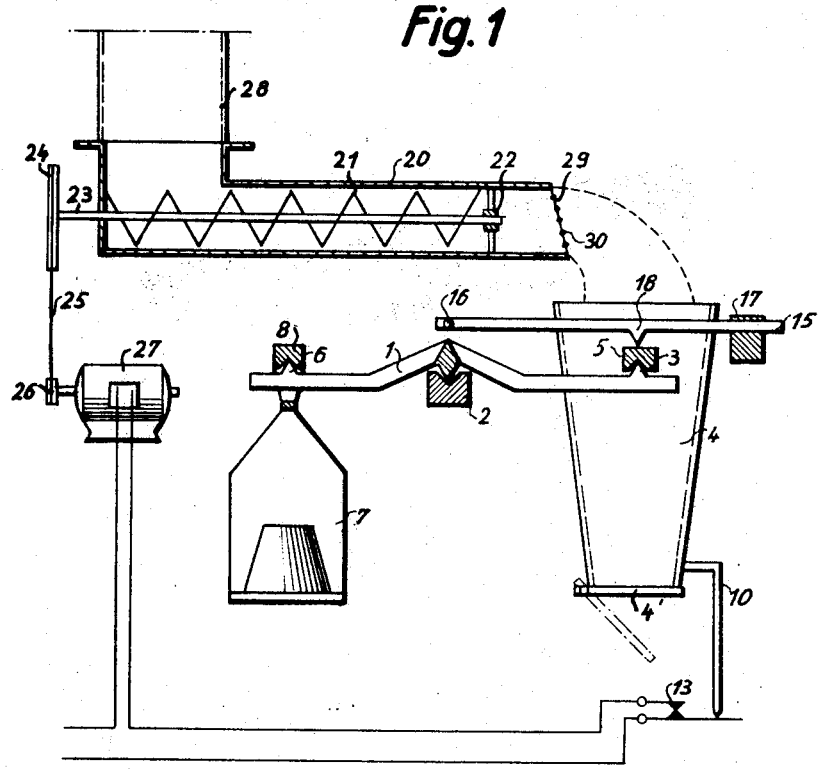
FIG. 1 is a schematic representation of a weighing apparatus in combination with a feeding mechanism and a control system according to the invention.

Referring now to the drawings in further detail, a scale beam 1 of a weighing apparatus is pivotally supported by fixed bearing members 2, e.g., bearing blocks or the like. A weighing receptacle 4 having bearing blocks 5 fixed on opposite sides is pivotally supported by a pair of knife-edge bearings 3 fixed at one end of the scale beam 1, whereas a knife-edge bearing 6 fixed at its opposite end pivotally supports a counterweight 7 by means of a fixed bearing block 8. At the bottom of the weighing receptacle 4 a shutting member 4' actuated by actuating means (not shown) is pivotally mounted and a control switch actuating member 10 is fixed to actuate a control switch 13. A lever 15 is pivotally mounted with its one end on a fixed pivot member 16 and carries a slidable weight 17 by its opposite end. Lever 15 is supported by the upper surface of the fixed bearing blocks 5 of weighing receptacle 4 in cooperation with a pair of downwardly directed knife-edge bearings 18 fixed accordingly on lever 15.

Figure 2:
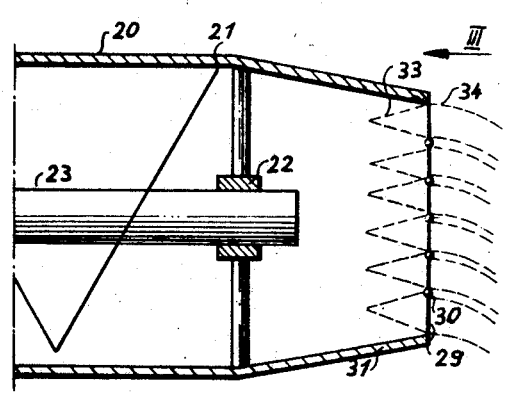
FIG. 2 is a sectional view of a detail of a modification of the configuration of the feeding mechanism.
Figure 3:
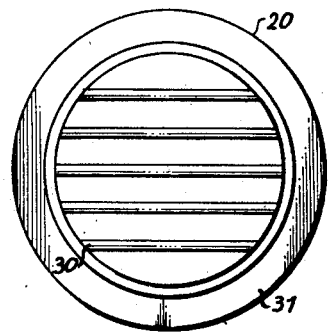
FIG. 3 is a view in the direction of the arrow III of FIG. 2.

The feeding mechanism comprises a tubular trough 20 having a conveyor worm 21 rotatably disposed therein. One end of the conveyor worm shaft 23 is journalled in a bearing 22. At the opposite end of the conveyor worm shaft 23, a sprocket wheel 24 is fixed and rotated by a chain drive 25 and a pinion 26 of a driving motor 27 energized by a circuit controlled by a control switch 13. The trough 20 has an inlet 28 of conveniently substantially rectangular shape and an outlet 29 having choking means 30, comprising a plurality of substantially horizontally disposed filaments or cutting wires 30 of relatively small cross section but stable and strong and extending across the outlet area 29 at its discharge end. In a modification represented in FIG. 2, the outlet area 29 is disposed in a vertical plane and the trough 20 has a tapered discharge end 31. In FIG. 1, the outlet opening 29 is disposed in a slanting plane, the base of the trough projecting outwardly.

Figure 4:
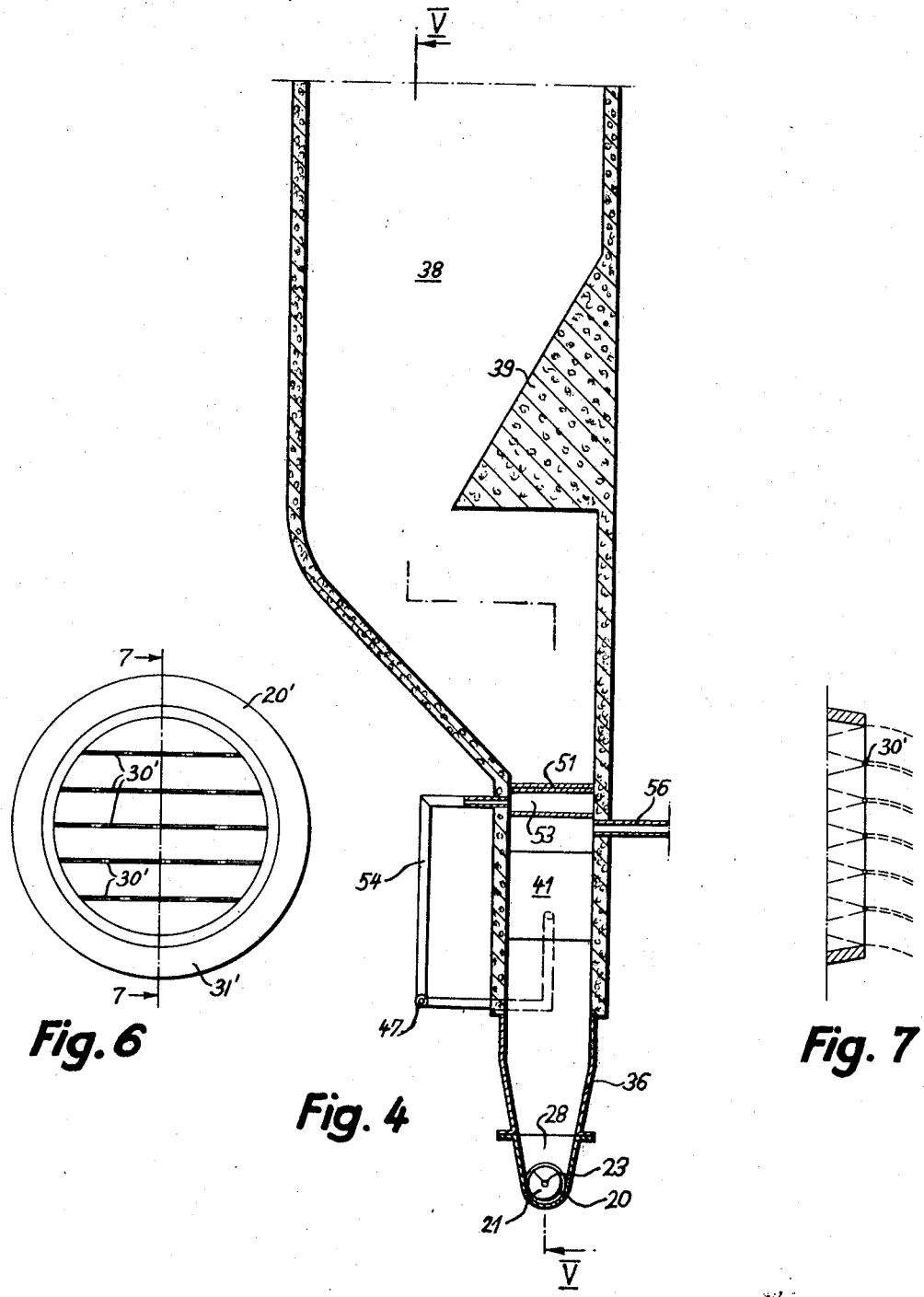
FIG. 4 is a vertical sectional view of the feeding mechanism in combination with a silo chamber, taken across the axis of the feeding worm.
Figure 5:
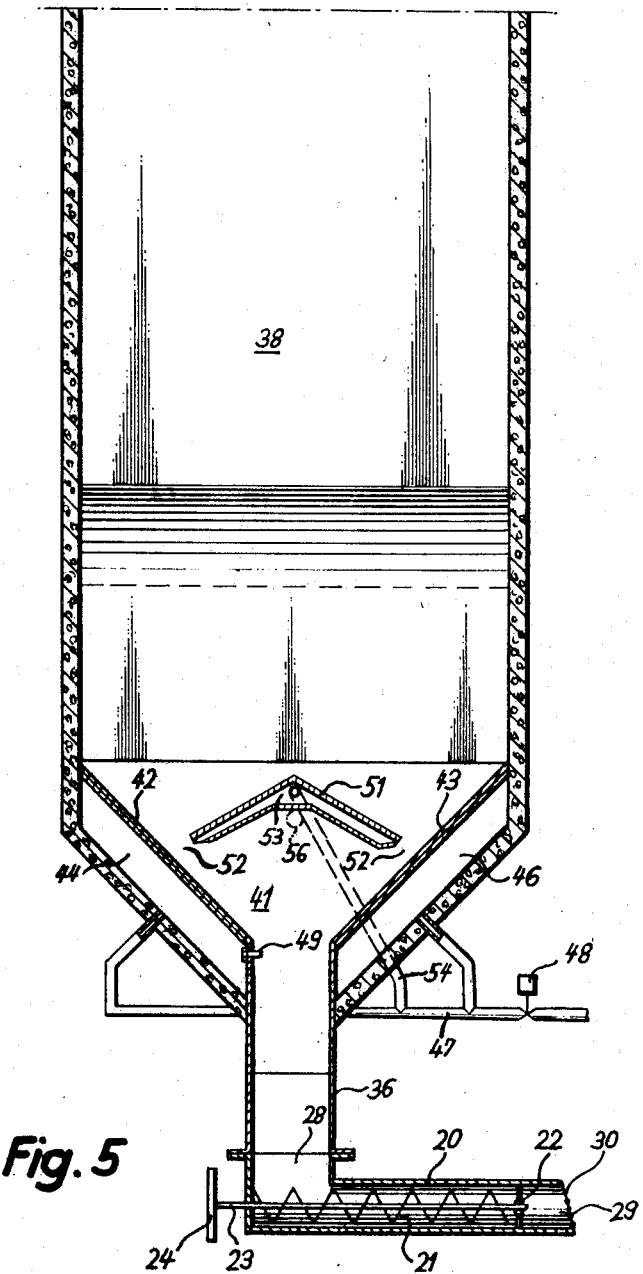
FIG. 5 is a vertical sectional view along the line V—V of FIG. 4.

The inlet 28 of the feeding mechanism is connected with a silo chamber 38 by a downpipe 36 (FIG. 4). The wall of the silo chamber 38 is provided with an inwardly directed wall projection forming a boss 39 disposed in its lower portion above the outlet 41 of the silo chamber 38. The wall projection 39 forming a pressure absorbing means relieves the two porous bottom portions 42, 43 sloping toward the outlet 41 of the silo chamber 38, thereby forming chutes which communicate with downpipe 36. Below the sloping bottoms or floor plates 42, 43 air chambers 44, 46 are disposed which communicate with a conduit system 47 supplying compressed air. In the conduit system 47, a shut-off valve 48 is disposed and controlled, for example, by a capacitance responsive filling height detector 49. The detector 49 may be any commercial device for electrically sensing the presence of material at the location of the device. Above the downpipe 36, between the outlet chutes 42, 43 a hollow porous retaining member 51 having a substantially inverted open V-shaped vertical cross section is disposed and leaves two bottleneck passages 52 therebetween. The hollow space 53 in retaining member 51 forms an air chamber communicating with the compressed air supply conduit system 47 as well as a conduit 54.

The operation of this arrangement is as follows:

The weight 17 which is slidably disposed on lever 15 is to be adjusted to such a position, wherein the knife-edge bearings 18 exert a bearing pressure on bearing blocks 5 of the receptacle 4 corresponding to the weight of the material which continues to drop into receptacle 4, and is therefore called the after flow weight, when the weight of response had been attained.

The filling height detector 49 keeps the downpipe 36 filled with material from the silo chamber 38. During operation of the conveyor worm 21, a large quantity of material flows into receptacle 4. The filling height level in downpipe 36 thereby drops to below the position of the filling height detector 49 which then opens the shut-off valve 48 and thus enables injection of compressed air from the air supply conduit system 47 into the air chambers 44, 46, 53, through the porous floor plates 42, 43 and the porous retaining member 51 into silo chamber 38. The compressed air thereby loosens and fluidizes the sloping material clogging the bottleneck passages 52 and restores material flow immediately to refill downpipe 36. As soon as the air shut-off valve 48 has been closed again by the filling height detector 49, the material stored in the silo chamber 38 largely loses its fluidity, clogs gains in the bottleneck passages 52 and stops flowing almost immediately. The automatic regulation of the material supply from chamber 38 by the filling height detector 49 therefore maintains a permanently uniform filling height level in the downpipe 36 and consequently uniform pressure conditions at the inlet of the feeding conveyor worm unit which results in a considerable increase of the dosing precision. As soon as the weight of response in the receptacle is attained the scale beam 1 tilts and actuating member 10 opens the control switch 13 thereby interrupting the energizing circuit of the driving motor 27, whereupon this latter together with the conveyor screw stop almost immediately. The choking means 30 facilitating initiation of a pressure formation in the trough as indicated schematically by a dotted line 33 in FIG. 2, the compressed material immediately stops the conveyor worm, resulting, in turn, in a reduction to a minimum of the afterflow. The weight of the afterflowing material as compared with the nominal, or rated weight of a weighing receptacle charge is therefore extremely small, with the result that the precision attained is amazingly high. The pressure built up can be further assisted by providing a tapered discharge end 31 of the trough 20. The tapered discharge end portion can be followed in the direction of the material flow by a relatively short cylindrical portion. By vertically subdividing the height of the discharge area 29 in combination with the relatively high rotation speed of the conveyor worm the outflowing material is subdivided into corresponding stream fractions 34. As soon as the conveyor worm 21 stops the stream fraction 34 break off between the choking members 30 which accurately define the entire separating area. In the individual fractions of the separating area no ditches or irregularities of importance can develop. The volume and weight of the afterflow is therefore very accurately defined.

Upon completion of the filling of weighing receptacle 4, the shutting member 4' opens in the manner already described and a new filling cycle can begin as soon as the scale beam has returned into its original position.

In FIGS. 6 and 7, the cutting wires 30' are substantially rectangular or diamond-shaped and they are arranged in a substantially vertical plane.

Although only preferred embodiments of this invention have been shown and described herein, it will be understood that various modifications and changes may be made in the construction shown without departing from the spirit of this invention as pointed out in the appended claims.

More particularly, it would be possible to apply the invention to a feeding means with coarse flow and fine flow when the requirements for precision are particularly stringent.

What is claimed is:

1. A feeding mechanism comprising a feeding trough having an inlet and a discharge, said trough being elongated for building up pressure at the discharge thereof, a conveyor worm in said trough, driving means connected to said conveyor worm to move said conveyor worm to direct material from said inlet toward said discharge, weighing means disposed adjacent said discharge, the space between said discharge and said weighing means defining an unobstructed path to said weighing means, said weighing means being in a position directly to receive material discharged through said discharge and for weighing the material which is received, control means connected to said driving means and connectable to said weighing means and responsive to variations of said weighing means to start and stop said driving means, and substantially horizontally disposed and vertically spaced substantially round wire cutting members disposed substantially in said trough discharge and forming a definite separating zone of very slight axial thickness for cutting ox further outflow of material at said discharge and separating the material along a substantially definite surface when said conveyor worm is stopped.

2. A feeding mechanism, according to claim 1, wherein said discharge has a generally substantially vertically disposed outlet area.

3. A feeding mechanism, according to claim 1, wherein said discharge has a generally substantially obliquely disposed outlet area.

4. A feeding mechanism, according to claim 1, wherein said discharge end of said trough is tapered in the direction of the discharge outlet.

5. A feeding mechanism, according to claim 1, including a silo disposed above the inlet of said trough having a bottom opening aligned over the inlet of said trough and including a sloping wall portion on each side of said opening of porous construction, a baffle member disposed above said opening and sloping downwardly to each side above said sloping chute walls, and means for fluidizing material in said silo by directing air under pressure to said baffle member and through said porous walls.

6. A feeding mechainsm, according to claim 5, including means in said silo bottom opening for sensing the height of material therein and connected to said compressed air means for turning said compressed air means on to fluidize the material in said silo when the material is sensed by said sensing means.

7. A feeding mechanism, according to claim 1, including a silo disposed over said trough inlet, said silo having a silo chamber with material therein and a down pipe connecting said silo chamber with said trough inlet, and means for selectively fluidizing material being fed from said silo chamber to said down pipe.

8. A feeding mechanism, according to claim 7, wherein said fluidizing means includes means for directing compressed air into said silo above said down pipe.

9. A feeding mechanism, according to claim 7, wherein said silo includes an inclined chute having a porous bottom plate, pressure absorbing means disposed above said plate and relieving said porous bottom plate from pressure exerted by mtaerial stored in said silo, said fluidizing means including means for directing compressed air through said porous plate and to said pressure absorbing means.

10. A feeding mechanism comprising a feeding trough having an inlet and a discharge, a conveyor worm in said trough, driving means connected to said conveyor worm to move said conveyor worm to direct material from said inlet toward said discharge, weighing means disposed adjacent said discharge, the space between said discharge and said weighing means defining an unobstructed path to said weighing means, said weighing means being in a position to receive material discharged through said discharge and for weighing the material which is received, control means connected to said driving means and connectable to said weighing means and responsive to variations of said weighing means to start and stop said driving means, and substantially horizontally disposed and vertically spaced fine wire cutting elements disposed in said trough discharge for facilitating initiation of a pressure formation in the material flow and forming a definite separating area at said discharge when said conveyor worm is stopped.

11. A feeding mechanism, according to claim 10, wherein said cutting wires are substantially rectangular.

12. A feeding mechanism, according to claim 10, wherein said cutting wires are substantially diamond-shaped.

13. A silo construction including a vertically elongated container having a central discharge leading to a vertically elongated discharge passage, a porous sloping bottom wall on each side of said discharge passage, a retaining member of roof-shaped configuration arranged directly above said vertical passage and spaced upwardly from said side walls and defining bottleneck passages on each side thereof adjacent the respective said side walls, a feeding trough having an inlet connected to said vertical passage and a discharge, a conveyor worm in said trough, driving means connected to said conveyor worm to move said conveyor worm to direct material from said vertical passage toward said discharge, fine wire cutting means disposed in said trough discharge forming a definite separating plane at said discharge when said conveyor worm is stopped, fluidizing gas means connected for directing fluidizing gas through the porous inclined walls of said silo to fluidize the material therein and cause flow through the bottleneck passages and downwardly into said vertical passageway, and control means located in said passageway and connected to said fluidizing gas means to actuate said air means whenever the level in said vertical passageway falls below a predetermined amount whereby to maintain the height of material in said inlet and thereby to maintain substantially constant inlet pressure on said worm.

14. A silo construction, according to claim 13, wherein said cutting wire means comprises a plurality of horizontally disposed cutting wires disposed in a common plane across said discharge opening.

15. A silo construction, according to claim 13, wherein said fluidizing gas means includes a connection to said retaining member, said retaining member having a top porous wall for the discharge of a fluidizing gas therethrough.

References Cited

UNITED STATES PATENTS

| 2,621,083 | 12/1952 | Daniels | 302—50 |
| 2,806,744 | 9/1957 | Hall et al. | 302—53 |
| 3,188,144 | 6/1965 | Gmur et al. | 302—29 |

FOREIGN PATENTS

| 269,899 | 3/1912 | Germany. |

RICHARD B. WILKINSON, Primary Examiner
G. H. MILLER, JR., Assistant Examiner

U.S. Cl. X.R.
302—53